United States Patent
Ichihashi (10) Patent No.: US 9,068,345 B2
(45) Date of Patent: Jun. 30, 2015

(54) MULTI-SECTIONAL ACOUSTIC SEPTUM

(71) Applicant: Hexcel Corporation, Dublin, CA (US)

(72) Inventor: Fumitaka Ichihashi, Chandler, AZ (US)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 13/964,741

(22) Filed: Aug. 12, 2013

(65) Prior Publication Data

US 2015/0041248 A1 Feb. 12, 2015

(51) Int. Cl.
| | | |
|---|---|---|
| *E04B 1/84* | (2006.01) | |
| *F02C 7/045* | (2006.01) | |
| *F02K 1/82* | (2006.01) | |
| *F02C 7/24* | (2006.01) | |
| *G10K 11/172* | (2006.01) | |
| *B64D 33/02* | (2006.01) | |

(52) U.S. Cl.
CPC . *E04B 1/84* (2013.01); *F02C 7/045* (2013.01); *F02K 1/827* (2013.01); *F02C 7/24* (2013.01); *G10K 11/172* (2013.01); *B64D 2033/0206* (2013.01); *F05D 2250/232* (2013.01); *F05D 2250/283* (2013.01)

(58) Field of Classification Search
CPC .............. E04B 1/84; F02C 7/045; F02C 7/24; F02K 1/827; G10K 11/172; F05D 2250/283; F05D 2250/232; B64D 2033/0206
USPC ........................................................ 181/292
See application file for complete search history.

(56) References Cited

U.S. PATENT DOCUMENTS

| | | | |
|---|---|---|---|
| 3,887,031 A | | 6/1975 | Wirt |
| 3,952,831 A | * | 4/1976 | Bernard et al. ............... 181/292 |
| 5,445,861 A | | 8/1995 | Newton et al. |
| 5,760,349 A | * | 6/1998 | Borchers et al. ............. 181/286 |
| 6,274,216 B1 | * | 8/2001 | Gonidec et al. ............... 428/116 |
| 6,536,556 B2 | * | 3/2003 | Porte et al. .................... 181/292 |
| 7,311,175 B2 | * | 12/2007 | Proscia et al. ................ 181/290 |
| 7,434,659 B2 | | 10/2008 | Ayle |
| 7,510,052 B2 | | 3/2009 | Ayle |
| 7,854,298 B2 | | 12/2010 | Ayle |

FOREIGN PATENT DOCUMENTS

| | | |
|---|---|---|
| EP | 0976883 A1 | 2/2000 |
| EP | 2605238 A2 | 6/2013 |

* cited by examiner

*Primary Examiner* — Jeremy Luks (74) *Attorney, Agent, or Firm* — W. Mark Bielawski; David J. Oldenkamp (57) ABSTRACT

A multi-sectional acoustic septum that includes sections which have different acoustic resistance properties. The multi-sectional acoustic septums extend vertically with the acoustic cell and are capable of increasing the effective acoustical length of the acoustic cell. The multiple acoustic properties provided by the multiple acoustic sections also make it possible to target specific frequency ranges within the overall frequency range of the acoustic cell.

18 Claims, 4 Drawing Sheets

MULTI-SECTIONAL ACOUSTIC SEPTUM

BACKGROUND OF THE INVENTION

1. Field of the Invention

The present invention relates generally to acoustic structures that are used to attenuate noise that emanates from a particular source. More particularly, the present invention is directed to providing relatively thin acoustic structures that are capable of attenuating a wide range of noise frequencies including relatively low-frequency noise, such as the low-frequency noise that is generated by the engines of aircraft.

2. Description of Related Art

It is widely recognized that the best way of dealing with excess noise generated by a specific source is to treat the noise at the source. This is typically accomplished by adding acoustic damping structures (acoustic treatments) to the structure of the noise source. One particularly problematic noise source is the jet engine used on most passenger aircraft. Acoustic treatments are typically incorporated in the engine inlet, nacelle and exhaust structures. These acoustic treatments include acoustic resonators that contain relatively thin acoustic materials or grids that have millions of holes that create acoustic impedance to the sound energy generated by the engine.

Honeycomb has been a popular material for use in aircraft and aerospace vehicles because it is relatively strong and lightweight. For acoustic applications, such as engine nacelles, acoustic materials are added to the honeycomb structure so that the honeycomb cells are acoustically closed at the end located away from the engine and covered with a porous covering at the end located closest to the engine. The closing of the honeycomb cells with acoustic material in this manner creates an acoustic resonator that provides attenuation, dampening or suppression of the noise. Acoustic septums are also usually located within the interior of the honeycomb cells in order to provide the resonator with additional noise attenuation properties.

A basic problem facing acoustic engineers is to make the nacelle as thin and lightweight as possible while still providing adequate suppression or dampening of the sound wave frequencies over the entire range of noise generated by the jet engine. This basic design problem is complicated by the fact that the trend in newer models of large jet engines is to produce additional noise at lower frequencies. The new engine designs tend to use fewer fan blades that produce more by-pass air at a slower velocities. This results in the production of engine noise having a lower frequency.

The particular frequencies of noise that are dampened by a given honeycomb cell or resonator is directly related to the depth of the cell. In general, as the frequency of the noise decreases, the depth of the cell must be increased in order to provide adequate damping or suppression. Relatively thin nacelles having cell depths on the order of 1 inch or less are adequate for absorbing the higher frequency ranges generated by a jet engine. However, deeper acoustic cells or resonators are required in order to absorb the lower frequencies that are being generated by newer jet engines.

One approach to solving the problem of absorbing the lower frequency jet noise is to simply build nacelles with deeper cells. However, this results in an increase in the size and weight of the nacelle which is contrary to the design goal of providing nacelles that are as thin and light weight as possible. In addition, the increase in weight and size of the nacelle required to absorb low-frequency noise may be unacceptable, especially for larger aircraft engines where the size and weight of the nacelle is a major engineering design consideration.

Another approach involves acoustically connecting adjacent cells together in order to increase the effective acoustic depth of the combined cells. This approach does provide lower frequency absorption; however, the number of available acoustic cells is reduced in any given structure due to the combination of multiple cells to form a single acoustic cell. The acoustic interconnection of cells to increase low frequency sound absorption is described in detail in U.S. patent application Ser. No. 13/466,232.

There presently is a need to design engine nacelles and other acoustic structures where the acoustic structure is capable of suppressing a wider range of noise frequencies without increasing the thickness or weight of the nacelle acoustic structure.

In addition, there is a present need to design acoustic structures where a number of specific noise frequency ranges within the overall noise frequency range that is damped by the acoustic structure can be targeted and specifically damped.

SUMMARY OF THE INVENTION

In accordance with the present invention, it was discovered that the acoustical range of a nacelle or other type of acoustic structure can be increased and specific frequency ranges targeted for damping by using multi-sectional septums. The multi-sectional septums extend vertically within the acoustic cells to provide various sections of the septum that have different acoustic damping properties. It was discovered that the use of such three dimensional sectioned septums not only allows one to increase the effective acoustic length of a resonator, but also allows one to target a number of specific noise frequencies within the overall acoustic range of the resonator.

The present invention is directed to acoustic structures, in general, and to nacelles for aircraft engines, in particular. The acoustic structures in accordance with the present invention include a honeycomb that has a first edge located closest to the noise source and a second edge located away from the noise source. The honeycomb includes a plurality of acoustic cells wherein each of the acoustic cells has a plurality of walls that extend between the first and second edges of the honeycomb. An acoustic barrier is located at the second edge of each acoustic cell to form an acoustic resonator that has a depth that is equal to the distance between the first edge of the honeycomb and the acoustic barrier.

As a feature of the present invention, a multi-sectional acoustic septum is located in the acoustic resonator. The multi-sectional septum includes a septum top located nearest the first edge of the honeycomb and a septum bottom located nearest the second edge of the honeycomb. The multi-sectional septum further includes a septum wall that extends vertically within the cell between the septum top and the septum bottom. The septum wall is divided into at least a first septum section located nearest to said septum top and a second septum section located nearest to said septum bottom. The acoustic damping provided by the first septum section is different from the acoustic damping provided by said second septum section.

When the first section of the septum wall is solid, it forms a sound wave guide. The sound wave guide divides the acoustic cell into two acoustical chambers. The two chambers provide an effective increase in resonator length of the cell. The effective length of the resonator cell can be varied by making the solid section shorter or longer. As a result, nacelles or other acoustic structures can be made that are capable of absorbing lower noise frequencies without increasing the thickness or number of cells in the nacelle.

As another feature of the invention, the various sections of the vertically extending septum wall can be solid, perforated or made from a mesh material in order to provide a wide variety of damping profiles where various specific noise frequency ranges are dampened by a single acoustic septum. The relative sizes and shapes of the septum sections can also be varied to provide even further accurate damping of specifically targeted noise frequency ranges.

A wide variety of effective acoustic lengths and specific acoustic damping properties of the honeycomb cell can be achieved in accordance with the present invention by simply varying the type of material used for the various sections of the three-dimensional septum, as well as, the length, location, size and shape of the various sections. The present invention provides a significant advantage over conventional acoustic honeycomb where the acoustic cells all have the same effective acoustic lengths and where the use of two-dimensional septums limits the number of specific frequency ranges that can be dampened.

The ability to acoustically lengthen honeycomb cells without increasing the honeycomb thickness is especially useful for jet engine nacelles where it is desirable to make the honeycomb as thin as possible while still providing acoustic resonators that are capable of dampening low-frequency jet engine noise. In addition, the use of three dimensional multi-sectioned septums in accordance with the present invention allows one to target and attenuate various specific frequency ranges generated by a particular jet engine that may be particularly problematic.

The above described and many other features and attendant advantages of the present invention will become better understood by reference to the following detailed description when taken in conjunction with the accompanying drawings.

DETAILED DESCRIPTION OF THE INVENTION

Figure 1:
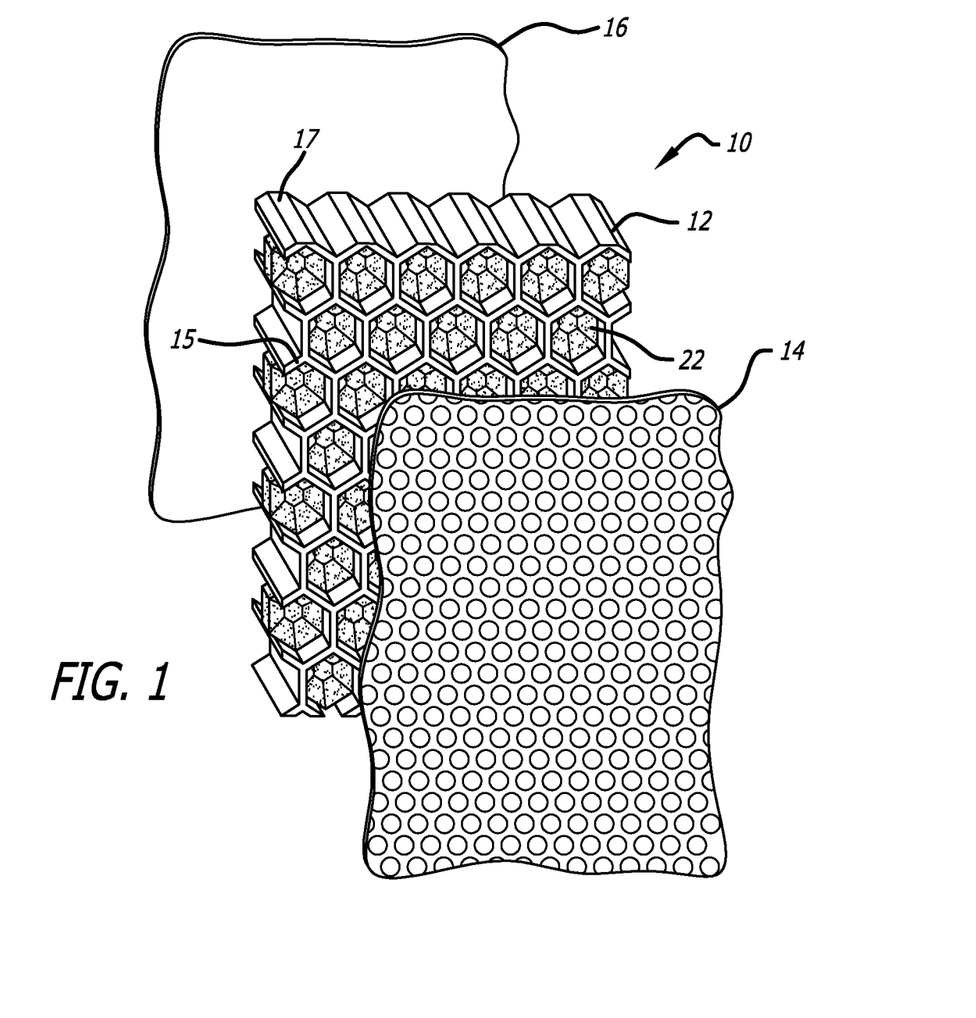
FIG. 1 shows an exemplary acoustic structure in accordance with the present invention prior to the solid and the porous face sheets being bonded to honeycomb.
Figure 7:
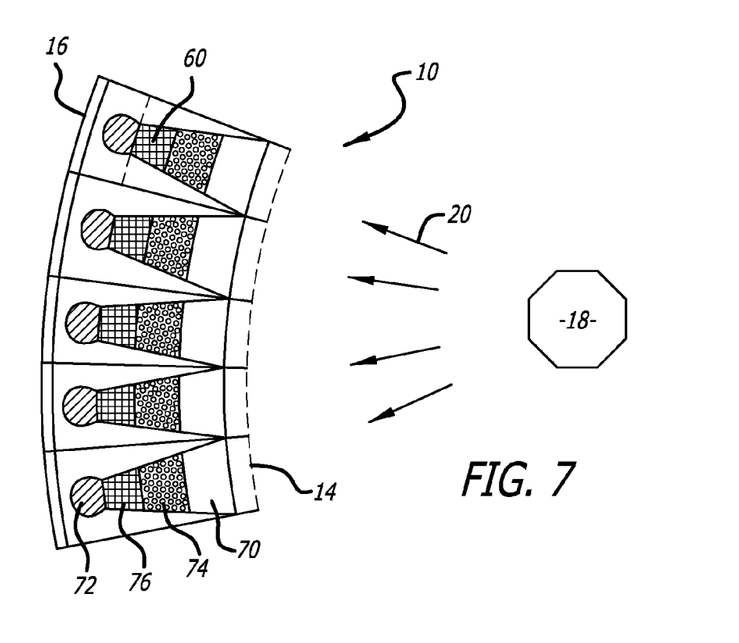
FIG. 7 is a schematic drawing showing a portion of an exemplary acoustic structure in accordance with the invention next to a noise source.

A partially exploded view of a portion of an exemplary acoustic structure in accordance with the present invention is shown at 10 in FIG. 1. The acoustic structure 10 includes an acoustic honeycomb 12 which is sandwiched between a porous face sheet 14 and a solid acoustic barrier face sheet 16. A portion of the assembled acoustic structure 10 is shown in FIG. 7 where it is located adjacent to a noise source 18 which is generating noise as represented by arrows 20.

Figure 5:
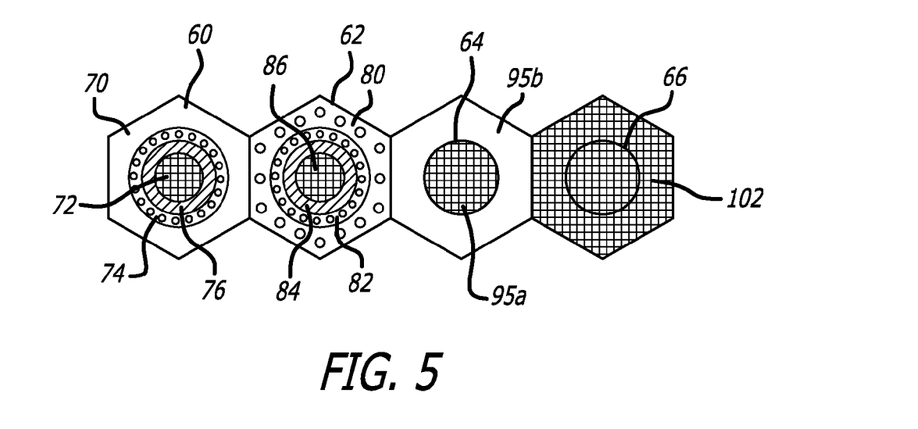
FIG. 5 is a top view of FIG. 4.

Although the acoustic structure of the present invention may be used for damping noise from a wide variety of noise sources, the acoustic structure is particularly well-suited for dampening noise generated by aircraft engines and particularly the large engines used for commercial aircraft. Accordingly, the acoustic structure shown at 10 in FIG. 5 is typically part of a nacelle which surrounds the central core of a turbofan jet engine 18.

The honeycomb 12 includes a first edge 15 that is located closest to the noise source 18 and a second edge 17 that is located away from the noise source 18. The walls of the honeycomb extend between the first and second edges to form a plurality of cells 22 that each has a cross-sectional area measured perpendicular to the walls. An acoustic barrier is located at or near the second edge 17 of each cell in order to make each cell an acoustic resonator. Although acoustic barriers may be inserted into the honeycomb cells and displaced away from the second edge 17, the typical procedure is to place a sound barrier sheet 16 on the second edge 17 of the honeycomb to cover all of the cells. The depth of all of the cells (acoustic resonators) is then equal to the distance between the first edge 15 and the acoustic barrier 16.

Figure 2:
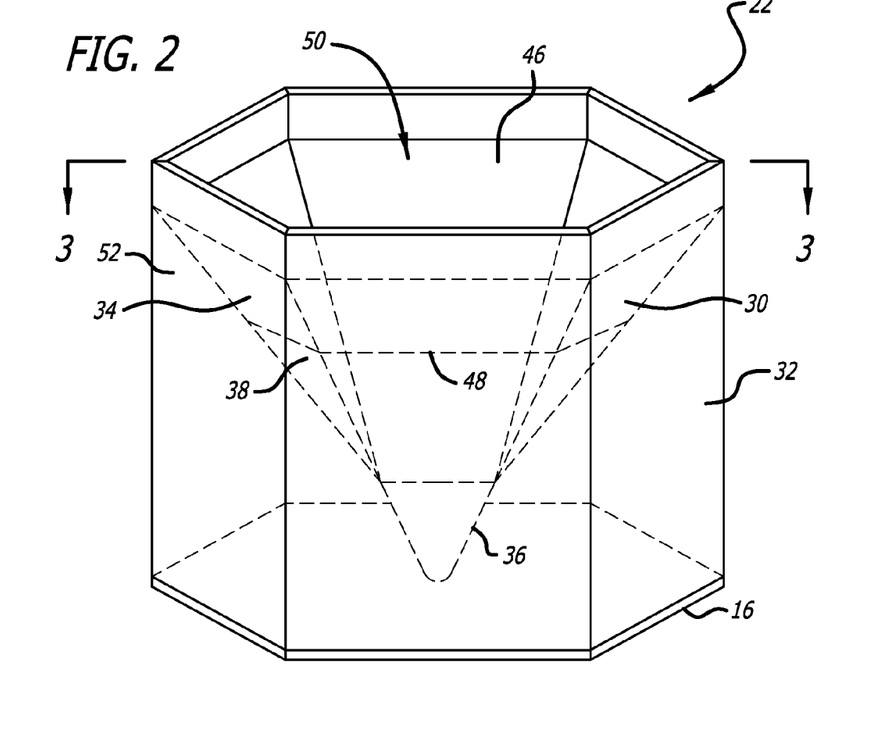
FIG. 2 shows a single exemplary acoustic cell in accordance with the present invention.
Figure 3:
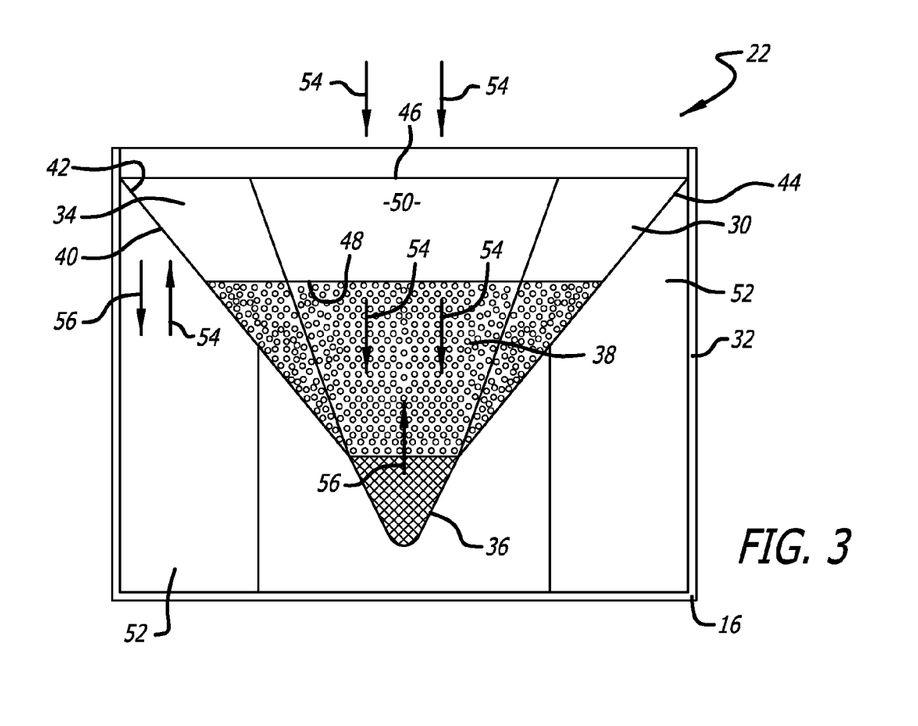
FIG. 3 is a sectional view of FIG. 2, which depicts the inner and outer acoustic chambers that are formed when the first section of the septum is made from a solid (acoustically impervious) material.

As shown in FIG. 1, the acoustic honeycomb 12 is made up of many interconnected cells 22. For descriptive purposes, a single cell 22 is shown in FIGS. 2 and 3 without the porous face sheet 14. In accordance with the present invention, a cone-shaped multi-sectional acoustic septum 30 is located in the acoustic resonator formed by the cell walls 32 and acoustic barrier 16. The multi-sectional septum 30 includes first septum section 34 and a second septum section 36. An additional septum section 38 is located between the first and second septum sections. More than one additional septum sections can be located between the first and second septum sections, if desired.

The first septum section 34 may be made from any of the materials used to make acoustic septums. However, it is preferred that the septum section 34 be made from a solid material, such as a plastic film or a mesh that has been coated with plastic to make it impermeable to sound waves. The solid septum section 34 functions as a wave guide that is in the form of a frusto conical duct. The solid septum section 34 includes walls 40 that have interior and exterior surfaces 42 and 44, respectively. The solid septum section 34 includes an inlet 46 and an outlet 48.

The solid septum section 34 divides the cell 22 into an inner sound wave channel or chamber 50 and an outer sound wave chamber 52. The inner sound wave chamber 50 is defined by the interior surface 42 of the septum section 34, the septum inlet 46, the first septum section outlet 48 and that portion of the cell wall that extends between the inlet 46 and the first edge 15 of the cell. The outer sound wave chamber 52 is defined by the exterior surface 44 of the septum section 34, the cell wall 32, the sound barrier 16 and the septum section outlet 48.

The second septum section 36 can also be made from any of the materials used to make acoustic septums. In this exemplary embodiment, the second septum section 36 is an acoustic mesh, such as woven monofilament septum material, that is in the form of a cone. The second septum section 36 does not act as a wave guide in the same manner as the first septum section 34. Instead, the mesh in the second septum section damps or attenuates the noise sound waves as they pass through the mesh and provides a secondary acoustic resonator with variable depth.

The additional septum section 38 can also be made from any of the materials used to make acoustic septums. In this exemplary embodiment, the additional septum section 38 is a perforated plastic film that has sufficient perforations to allow sound waves to pass through the perforations. The additional septum section 38, like the second septum section 36, does not act as a wave guide in the same manner as the first septum section 34, but rather acts as an acoustic resonator. The mesh used in second septum section 36 is chosen so that the noise damping (acoustic resistance) properties of the mesh are different from the perforated film or sheet used in the additional septum section 38.

As shown in FIG. 3, the sound entering the resonator (arrows 54) travels through the inner sound wave chamber 50 and passes through the first septum section outlet 48 into the two other septum sections 36 and 38 and into the outer sound wave chamber 52. The sound waves 54 are reflected back by the defining surfaces of the outer sound wave chamber 52 as shown by arrows 56. The reflected sound waves 56 travel back out through the two septum sections 36 and 38 and through the solid septum outlet 48 into the inner sound wave chamber 50.

The use of a sound wave guide, such as solid first septum section 34, controls the path of the incoming sound waves so that their effective travel path is greater than the depth of the acoustic resonator. This increase in the effective travel path of the sound waves is controlled and limited by the size and shape of the inner and outer wave chambers. The size and shape of the two wave chambers is in turn determined by the size, shape and location of the solid section or sections of the multi-sectional septum wave guide. The effective acoustic length of the cell 22 can be increased by making the solid first septum section 34 so that it extends further down into the cell.

The exemplary multi-sectional septum 30 includes a solid first section 34 that functions as an acoustic wave guide, a second mesh section 36 and an additional middle section 38, which is perforated. Accordingly, the multi-sectional septum 30 provides three different levels of noise wave guidance and damping. Co-pending U.S. application Ser. No. 13/964,629 describes details of acoustic chambers in which acoustic wave guides are placed inside acoustic chambers in the same manner as solid first section 34. The contents of this co-pending application are hereby incorporated by reference.

Figure 4:
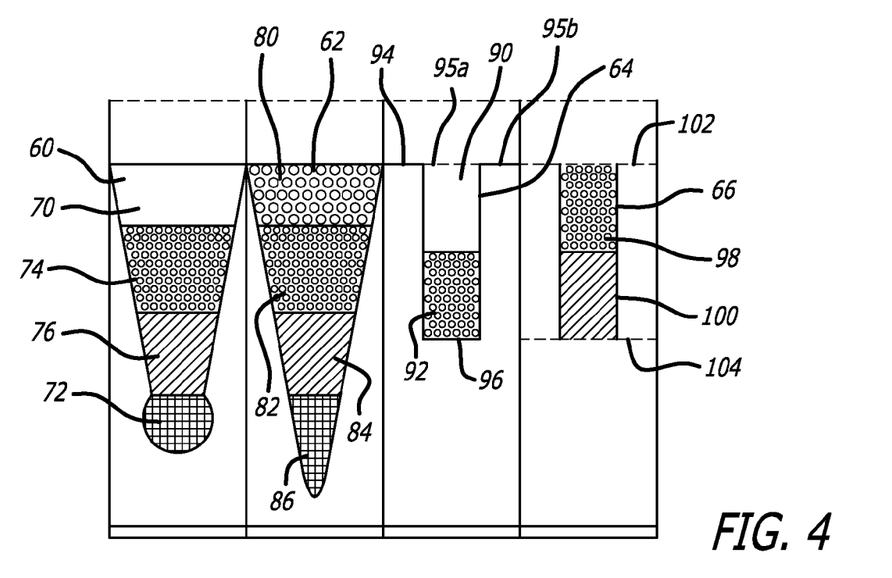
FIG. 4 is a schematic side view showing four different three dimensional septum configurations within four cells of an acoustic honeycomb.

A wide variety of multi-sectional acoustic septum sizes, shapes and configurations in accordance with the present invention are possible. Four exemplary multi-sectional septums are shown in FIGS. 4 and 5 at 60, 62, 64 and 66. The multi-sectional septum 60 includes a first solid film section 70 and a bulb-shaped second section 72 that is made from a mesh septum material. The multi-sectional septum 60 further includes two additional septum sections which are shown at 74 and 76. Septum section 74 is a perforated film or sheet and septum section 76 is a septum mesh material that is coarser than the mesh used in section 72. The multi-sectional septum 60 provides wave guidance in the first section 70 to increase the acoustic depth of the acoustic cell while the remaining three septum sections provide the septum with three different damping values. In an exemplary embodiment, the septum materials for the various sections would be chosen such that the cgs Rayl value (1 dyne-second per cubic centimeter) for section 74 would be 80 cgs R at (1200-1400 Hz) while sections 76 and 72 would have cgs Rayl values of 60 cgs R (1400-1600 Hz) and 50 cgs R (1600-1800 Hz), respectively.

The exemplary multi-sectional septum 62 does not include a solid wave guide section. Instead, the septum 62 includes four acoustic damping sections 80, 82, 84 and 86. Section 80 is composed of a perforated film that has a cgs Rayl value of 100 for frequencies from 1000-1200 Hz. Section 82 is composed of a perforated film that has a cgs Rayl value of 80 (1200-1400 Hz). The sections 84 and 86 are composed of acoustic mesh having Rayl values of 60 cgs R (1400-1600 Hz) and 50 cgs R (1600-1800 Hz), respectively.

Multi-sectional septums that are conical or frusto-conical in shape are only one possible septum shape. It is only important that the septum be divided into sections with different wave guiding and/or damping properties and that the septum must extend vertically within the acoustic cell. For example, the three-dimensional and multi-sectional septums in accordance with the present invention can be in the shape of a cylinder or other tubular shape.

An exemplary cylindrical multi-sectional septum is shown at 64. The cylindrical septum 64 includes a solid section 90 and a perforated section 92. The cylindrical septum 64 is attached to the honeycomb walls by way of a septum 94, which includes a perforated or mesh central portion 95a and a solid perimeter or shoulder portion 95b that is bonded to the cell walls. Septum section 90 acts as a wave guide to increase the effective acoustic length of the cell while the perforated section 92 provides an acoustic resonator. An additional mesh septum material may be located at the bottom of the cylindrical septum 64 to provide additional noise attenuation, as shown at 96.

Another exemplary cylindrical multi-sectional septum is shown at 66. This cylindrical septum includes a first septum section 98 and a second septum section 100. The first septum section 98 is made up of a perforated sheet and the second septum section 100 is composed of acoustic mesh material. The cylindrical septum 66 is attached to the cell walls by a mesh septum material 102, which is bonded to the cell walls. A mesh septum material 104 may also be located at the bottom of the cylindrical multi-element septum to provide additional anchoring of the cylindrical septum to the cell walls, as well as additional noise damping.

The size, shape, location, configuration and types of material used to make the various sections of the multi-sectional septum can be varied in order to achieve a wide range of acoustic wave guiding and damping properties. The same type of multi-sectional septum may be placed at the same location within a relatively large group of acoustic cells. Alternatively, one can mix and match a variety of different multi-sectional septums at various locations within the acoustic structure to produce acoustic structures with a wide variety of acoustic properties.

Additional acoustic dampening and attenuation can be provided by including one or more conventional two-dimensional septums within the acoustic cell. It also is possible to include a plurality of two-dimensional acoustic septums inside, above and/or below the multi-sectional septum.

The various non-solid sections of the multi-sectional acoustic septum can be made from any of the standard acoustic materials used it to provide noise attenuation including woven fibers and perforated sheets. For the mesh sections, the use of woven fiber acoustic septum material is preferred. These mesh-type acoustic materials are typically provided as relatively thin sheets of an open mesh fabric that are specifically designed to provide noise attenuation. It is preferred that the acoustic material be an open mesh fabric that is woven from monofilament fibers. The fibers may be composed of glass, carbon, ceramic or polymers. Monofilament polymer fibers made from polyamide, polyester, polyethylene chlorotrifluoroethylene (ECTFE), ethylene tetrafluoroethylene (ETFE), polytetrafluoroethylene (PTFE), polyphenylene sulfide (PPS), polyfluoroethylene propylene (FEP), polyether ether ketone (PEEK), polyamide 6 (Nylon 6, PA6) and polyamide 12 (Nylon 12, PA12) are just a few examples. Open mesh fabric made from PEEK is preferred for high temperature applications, such as nacelles for jet engines. Exemplary septum mesh materials are further described in U.S. Pat. Nos. 7,434,659; 7,510,052 and 7,854,298, the contents of which are hereby incorporated by reference. The septum material that is used in the perforated sections of the multi-sectional septum is preferably made by laser drilling plastic sheets made from any of the above-identified plastics.

The solid sections of the multi-sectional septum may be made from a wide variety of materials provided that they are compatible with the other septum material(s) used to make the multi-sectional septum. It is preferred that the same types of materials described above for use in making the acoustic resistance sections of the multi-sectional septum are also used to make the solid sections. The solid walls are preferably made from an acoustically impervious material so that there is minimal sound transfer laterally through the solid section of the multi-sectional septum. The use of solid walls insures that all of the sound waves entering the acoustic cell must travel completely through the inner sound wave chamber before entering the outer sound wave chamber.

The inlet end of the multi-sectional septum is preferably shaped to match the walls of the acoustic cell. For example, multi-sectional septums used in acoustic cells with hexagonal cross-sections will have an inlet end that matches the hexagonal shape of the cell. This allows the multi-element septum to be securely bonded to the walls of the acoustic cells. The multi-sectional septum inlet may be bonded to the acoustic cell walls using known adhesive techniques including thermal bonding. A flange may be included as part of the top of the multi-sectional septum to provide increased surface area for bonding to the honeycomb walls.

The multi-sectional septum may be made, inserted into the acoustic cell and bonded in place in the same manner as the two-dimensional acoustic septums described above in U.S. Pat. Nos. 7,434,659; 7,510,052 and 7,854,298, the contents of which is hereby incorporated by reference. The main difference being that the present multi-sectional septums are three-dimensional and extend vertically within the cell whereas the prior acoustic septums are substantially planar.

Figure 6:
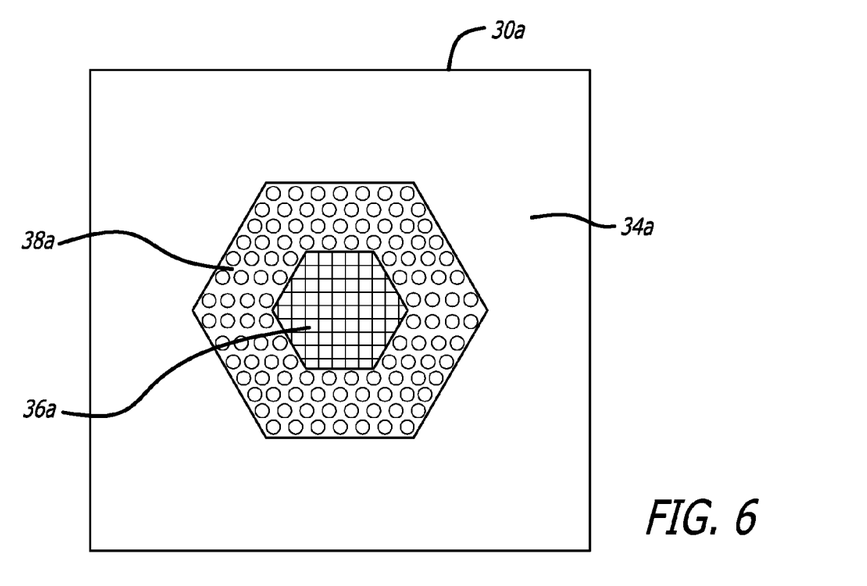
FIG. 6 is a top view of an exemplary septum prior to the septum being inserted into an acoustic cell to form a three dimensional sectioned septum in accordance with the present invention.

An exemplary two-dimensional septum that can be inserted into a honeycomb cell 22 to form multi-sectional three-dimension septum 30 is shown in FIG. 6 at 30*a*. The septum 30*a* is made from an acoustic mesh material in which a first section 34*a* has been coated with plastic in order to render the first section solid and impervious to sound waves. The second section 36*a* is not treated so that it remains as an acoustic mesh. The additional section 38*a* is coated with plastic to make it solid and then laser drilled to provide perforations in this section. The two-dimensional septum is inserted into the honeycomb cell so as to form the three-dimensional and multi-sectional septum 30 as shown in FIGS. 2 and 3. After it has been inserted into the acoustic cell and formed into the desired three-dimensional shape, the multi-sectional septum is bonded in place using suitable adhesive.

The multi-sectional septum may be formed by treating a single piece of mesh material to form the various sections as described above. However, it is possible to fabricate multi-sectional septums by first forming the various sections and then bonding them together in the desired configuration. Other fabrication processes are possible provided that the resulting three-dimensional septum includes sections that are connected together at the boundary between the sections in a manner that does not negatively affect the acoustic properties of the multi-sectional septum. A combination of fabrication processes is also possible. For example, the multi-sectional septum 60 shown in FIG. 4 can be made by first forming the sections 70, 74 and 76 from a single piece of acoustic mesh that has been treated to make section 70 solid and section 74 perforated. The piece of treated mesh is then formed into a frusto-conical shape with the final bulb-shaped mesh section 72 being bonded to the bottom of the frusto-conical septum. The completed bulb-terminated cone-shaped septum is then inserted into the acoustic cell and bonded to the cell walls.

The perimeter at the top of the multi-sectional septum does not have to match the cross-sectional shape of the acoustic cell. The top perimeter may have a smaller cross-sectional area and/or a different shape. In these cases, a shoulder or connecting piece is provided between the perimeter of the septum top and the cell walls. The shoulder is preferably made from a sound impervious material so that all of the sound waves are directed through the septum inlet. If desired, the shoulder or connecting piece can be made from a sound permeable material, such as mesh or perforated septum material. For example, see cylindrical septum 66 in FIG. 4, which is attached to the cell wall via a mesh shoulder that also extends over the top of the septum.

The materials used to make the honeycomb cells can be any of those typically used in acoustic structures including metals, ceramics and composite materials. Exemplary metals include aluminum and aluminum alloys. Exemplary composite materials include fiberglass, Nomex and various combinations of graphite or ceramic fibers with suitable matrix resins. Matrix resins that can withstand relatively high temperatures (300° F. to 400° F.) are preferred. The materials used to make the solid face sheet 16 can also be any of the solid face sheet materials commonly used for acoustic structures which typically include the same type of materials used to make the honeycomb structure. The materials used to make the porous face sheet 14 can also be any of the materials commonly used for such porous structures provided that the pores or perforations in the structure are sufficient to allow the sound waves from the jet engine or other source to enter into the acoustic cells or resonators.

For jet engine nacelles, the honeycomb cells will typically have a cross-sectional area of between about 0.1 to 0.5 square inch and a depth of between about 1.0 and 2.0 inches. The use of multi-sectional septums with partial solid walls allows one to make nacelles having honeycomb cell depths at the lower end of the thickness range that provide the same low-frequency noise attenuation or suppression that is provided by nacelles having thicknesses at the upper end of the thickness range.

The ability to take a nacelle that is a certain thickness and increase the effective resonator length without increasing the thickness of the resonator or decreasing the number of available acoustic cells is a significant advantage, since it allows one to make the nacelle as thin and lightweight as possible, while still being able to dampen the relatively lower frequency noise that is being generated by modern jet engine designs. In addition, the use of a multi-sectional septum that extends vertically within the cell (three-dimensional septum) allows one to target and dampen multiple specific frequency ranges at both the high and low end of the sound frequencies generated by noise sources and particularly jet engines.

As mentioned previously, it is preferred that a solid face sheet 16 be used as the sound barrier to close off the second edge 17 of the honeycomb to form the acoustic resonators. In this situation, the sound barriers are all located along the second edge of the honeycomb. The acoustic depth of the cells can be varied, if desired, by using individual barriers instead of a face sheet. The individual barriers are inserted and bonded in place within the cell to provide the desired acoustic resonator depth.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. An acoustic structure for reducing noise generated from a source, said acoustic structure comprising:
   a honeycomb comprising a first edge to be located closest to said source and a second edge, said honeycomb comprising a plurality of honeycomb walls that extend between said first and second edges, said honeycomb walls defining a plurality of cells wherein each of said cells has a cross-sectional area measured perpendicular to said honeycomb walls;
   an acoustic barrier located at the second edge of said honeycomb or within at least one of said cells to form an acoustic resonator wherein the depth of said acoustic resonator is equal to the distance between the first edge of said honeycomb and said acoustic barrier;
   a sound wave guide located in said acoustic resonator, said sound wave guide comprising a solid acoustic guide wall that is impermeable to sound waves, said solid acoustic guide wall having interior and exterior surfaces said solid acoustic guide wall comprising an inlet edge defining a wave guide inlet and outlet edge defining a wave guide outlet wherein said wave guide inlet is closer to said honeycomb first edge than said wave guide outlet and wherein said solid acoustic guide wall divides said honeycomb cell into an inner sound wave channel defined by the interior surface of said solid acoustic guide wall, said wave guide inlet, said wave guide outlet and the portion of said cell wall that extends between said wave guide inlet and the first edge of said honeycomb and an outer sound wave chamber defined by the exterior surface of said solid acoustic guide wall, said acoustic barrier, said wave, guide outlet and said honeycomb wall;
   a first acoustic septum attached to said wave guide outlet, said first acoustic septum having a top attached to said wave guide outlet and a bottom located nearest the second edge of said honeycomb, said first acoustic septum comprising a sound permeable wall that has a sound damping value and which extends between the top and the bottom of said first acoustic septum to provide a first septum resonator attached to said sound wave guide; and
   a second acoustic septum that is attached to the bottom of said first acoustic septum, said second acoustic septum having a top attached to the bottom of said first acoustic septum and a bottom located nearest the second edge of said honeycomb, said second acoustic septum comprising a sound permeable wall that has a sound damping value and which extends between the top and the bottom of said second acoustic septum to provide a second septum resonator wherein the acoustic damping value of the wall of said first acoustic septum is different from the acoustic damping value of the wall of said second acoustic septum.

2. An acoustic structure according to claim 1 wherein said wave guide inlet is larger than said wave guide outlet so as to form a frusto-conical shaped sound wave guide.

3. An acoustic structure according to claim 2 wherein the top of said first acoustic septum is larger than the bottom of said first acoustic septum so as to form a frusto-conical shaped first acoustic septum.

4. An acoustic structure according to claim 1 wherein said second acoustic septum is in the shape of a cone.

5. An acoustic structure according to claim 1 wherein the wall of said first acoustic septum is a perforated wall.

6. An acoustic structure according to claim 1 wherein the wall of said first acoustic septum is a perforated wall and the wall of said second acoustic septum is a mesh.

7. An acoustic structure according to claim 1 wherein the sound damping value of the sound permeable wall of said first acoustic septum is greater than the sound damping value of the sound permeable wall of said second acoustic septum.

8. An engine nacelle comprising an acoustic structure according to claim 1.

9. An airplane comprising a nacelle according to claim 8.

10. A method for making an acoustic structure for reducing noise generated from a source, said method comprising the steps of:
    providing a honeycomb comprising a first edge to be located closest to said source and a second edge, said honeycomb comprising a plurality of honeycomb walls that extend between said first and second edges, said honeycomb walls defining a plurality of cells wherein each of said cells has a cross-sectional area measured perpendicular to said honeycomb walls;
    locating an acoustic barrier at the second edge of said honeycomb or within at least one of said cells to form an acoustic resonator Wherein the depth of said acoustic resonator is equal to the distance between the first edge of said honeycomb and said acoustic barrier;
    locating a sound wave guide in said acoustic resonator, said sound wave guide comprising a solid acoustic guide wall that is impermeable to sound waves, said solid acoustic guide wall having interior and exterior surfaces, said solid acoustic guide wall comprising an inlet edge defining a wave guide inlet and outlet edge defining a wave guide outlet wherein said wave guide inlet is closer to said honeycomb first edge than said wave guide outlet and wherein said solid acoustic guide wall divides said honeycomb cell into an inner sound wave channel defined by the interior surface of said solid acoustic guide wall, said wave guide inlet, said wave guide outlet and the portion of said cell wall that extends between said wave guide inlet and the first edge of said honeycomb and an outer sound wave chamber defined by the exterior surface of said solid acoustic guide wall, said acoustic barrier, said wave guide outlet and said honeycomb wall;
    locating a first acoustic septum at said wave guide outlet, said first acoustic septum having a top attached to said wave guide outlet and a bottom located nearest the second edge of said honeycomb, said first acoustic septum comprising a sound permeable wall that has a sound damping value and which extends between the top and the bottom of said first acoustic septum to provide a first septum resonator attached to said sound wave guide; and
    locating a second acoustic septum at the bottom of said first acoustic septum, said second acoustic septum having a top which is attached to the bottom of said first acoustic septum and a bottom located nearest the second edge of said honeycomb, said second acoustic septum comprising a sound permeable wall that has a sound damping value and which extends between the top and the bottom of said second acoustic septum to provide a second septum resonator wherein the acoustic damping value of the wall of said first acoustic septum is different from the acoustic damping value of the wall of said second acoustic septum.

11. A method for making an acoustic structure according to claim 10 wherein said wave guide inlet is larger than said wave guide outlet so as to form a frusto-conical shaped sound wave guide.

12. A method for making an acoustic structure according to claim 11 wherein the top of said first acoustic septum is larger than the bottom of said first acoustic septum so as to form a frusto-conical shaped first acoustic septum.

13. A method for making an acoustic structure according to claim 10 wherein said second acoustic septum is in the shape of a cone.

14. A method for making an acoustic structure according, to claim 10 wherein the wall of said first acoustic septum is a perforated wall.

15. A method for making an acoustic structure according to claim 10 wherein the wall of said first acoustic septum is a perforated wall and the wall of said second acoustic septum is a mesh.

16. A method for making an acoustic structure according to claim 10 wherein said acoustic structure is a nacelle for a jet engine.

17. A method for making an acoustic structure according to claim 10 wherein the sound damping value of the sound permeable wall of said first acoustic septum is greater than the sound damping value of the sound permeable wall of said second acoustic septum.

18. A method for reducing the noise generated from a source of noise, said method comprising the step of at least partially surrounding said source of noise with an acoustic structure according to claim 1.

* * * * *